United States Patent
Ohgose et al.

(10) Patent No.: US 8,073,057 B2
(45) Date of Patent: Dec. 6, 2011

(54) MOTION VECTOR ESTIMATING DEVICE, AND MOTION VECTOR ESTIMATING METHOD

(75) Inventors: Hideyuki Ohgose, Osaka (JP); Hiroki Inagaki, Osaka (JP); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 1340 days.

(21) Appl. No.: 11/659,366

(22) PCT Filed: Aug. 3, 2005

(86) PCT No.: PCT/JP2005/014178
§ 371 (c)(1), (2), (4) Date: Feb. 5, 2007

(87) PCT Pub. No.: WO2006/013877
PCT Pub. Date: Feb. 9, 2006

(65) Prior Publication Data
US 2008/0212675 A1 Sep. 4, 2008

(30) Foreign Application Priority Data
Aug. 5, 2004 (JP) .................................. 2004-229039

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.16

(58) Field of Classification Search .................. None
See application file for complete search history.

(56) References Cited

U.S. PATENT DOCUMENTS
5,151,784 A * 9/1992 Lavagetto et al. ........ 375/240.12
(Continued)

FOREIGN PATENT DOCUMENTS
| | | |
|---|---|---|
| CA | 2 256 071 | 6/1999 |
| EP | 0 570 127 A2 | 11/1993 |
| JP | 06-113290 | 4/1994 |
| JP | 06-237454 | 8/1994 |

(Continued)

OTHER PUBLICATIONS

International Preliminary Report on Patentability and Written Opinion issued in International Application No. PCT/JP2005/014178, dated Feb. 15, 2007.

(Continued)

*Primary Examiner* — Nhon Diep
(74) *Attorney, Agent, or Firm* — McDermott Will & Emery LLP

(57) ABSTRACT

To provide a motion vector estimating device which is capable of calculating the optimum motion vector by a trade-off between the bit rate of a motion vector and a differential amount, and estimating a motion vector in a pipeline structure at high speed, a motion vector estimating method which enables the same. The motion vector estimating device (100) includes: a first motion vector estimating unit (102) which calculates an evaluation value based on the amount of distortion calculated using search blocks and an input block and a correction value calculated using a motion vector with respect to each search block, a first prediction vector, and a weighting coefficient, and estimates a first motion vector of the input block based on the location of the input block and the location of a search block which provides the smallest evaluation value; a weighted coefficient calculating unit (103) which calculates the weighted coefficient; a prediction vector generating unit (104) which generates the first motion vector based on the first motion vector; and a second motion estimating unit (105) which estimates a motion vector determining, as an evaluation value, only the amount of distortion calculated using the search blocks and the input block.

17 Claims, 8 Drawing Sheets

U.S. PATENT DOCUMENTS

| | | | |
|---|---|---|---|
| 5,392,073 | A | 2/1995 | Jeong |
| 5,400,087 | A | 3/1995 | Uramoto et al. |
| 5,717,463 | A * | 2/1998 | Brailean et al. ......... 375/240.12 |
| 7,356,082 | B1 * | 4/2008 | Kuhn ...................... 375/240.16 |
| 2001/0021272 | A1 | 9/2001 | Yamori et al. |
| 2004/0202245 | A1 | 10/2004 | Murakami et al. |
| 2005/0123039 | A1 | 6/2005 | Song et al. |

FOREIGN PATENT DOCUMENTS

| | | |
|---|---|---|
| JP | 08-084345 | 3/1996 |
| JP | 11-239350 | 8/1999 |
| JP | 11-243551 | 9/1999 |
| JP | 2001-197501 | 7/2001 |

OTHER PUBLICATIONS

Chalidabhongse, Junavit, et al., "Fast Motion Vector Estimation Using Multiresolution-Spatio-Temporal Correlations", IEEE Transactions on Circuits and Systems for Video Technology, Jun. 1, 1997, pp. 477-488, vol. 7. No. 3.

Boroczky, Lille, et al., "Advanced Spatiotemporal Propagation Strategy for Multiresolution Motion Estimation", Signal Processing VII: Theories and Application, Proceedings of EUSIPCO, Sep. 13, 1994, pp. 680-683, vol. 2.

Zan, J. et al., "Neighbourhood-blocks motion vector estimation technique using pyramidal data structure", IEE Proceedings: Vision, Image, and Signal Processing, Institution of Electrical Engineers, GB, Jun. 21, 2002, pp. 140-151, vol. 149 No. 3.

Schvvarz, H., et al., "An Improved H.26L Coder Using Lagrangian Coder Control", ITU Telecommunications Standardization Sector Study Group 16, Oct. 18, 2001, pp. 1-8.

Coban, Muhammed Z, et al., "Fast Rate-Constrained N-Step Search Algorithm for Motion Estimation", IEEE International Conference on Acoustics, Speech, and Signal Processing, May 12-15, 1998, pp. 2613-2616, vol. 5.

Cantineau, O., et al., "Efficient Parallelisation of an MPEG-2 Codec on a TMS320C80 Video Processor", International Conference on Image Processing, Oct. 4-7, 1998, pp. 977-980, vol. 3.

Lin, Chia-Wen, et al., Hierarchical Disparity Estimation Using Spatial Correlation, IEEE Transactions on Consumer Electronics, Aug. 1, 1998, pp. 630-637, vol. 44 No. 3.

Chung, Hyukjune, et al., "Fast long-term motion estimation for H.264 using multiresolution search", IEEE International Conference on Image Processing, Sep. 14-17, 2003, pp. I-905-908, vol. 1.

Mizuno, Masayuki, et al., "A 1.5-W Single-Chip MPEG-2 MP@ML Video Encoder with Low Power Motion Estimation and Clocking", IEEE Journal of Solid-State Circuits, Nov. 1, 1997, pp. 1807-1816, vol. 32 No. 11.

Kossentini, Faouzi, et al., "Predictive RD Optimized Motion Estimation for Very Low Bit-Rate Video Coding" IEEE Journal on Selected Areas in Communications, Dec. 1, 1997, pp. 1752-1763, vol. 15 No. 9.

Accame, M., et al., "Hierarchical Motion Estimator (HME) for Block-Based Video Coders", IEEE Transactions on Consumer Electronics, Nov. 1, 1997, pp. 1320-1330, vol. 43 No. 4.

Extended European Search Report, issued in European Patent Application No. 05768427, dated Aug. 26, 2011.

* cited by examiner

MOTION VECTOR ESTIMATING DEVICE, AND MOTION VECTOR ESTIMATING METHOD

TECHNICAL FIELD

The present invention relates to a motion vector estimating device which estimates a motion vector used in inter-picture predictive coding of a moving picture and a motion vector estimating method of the same.

BACKGROUND ART

In an image compression method such as the Moving Picture image coding Experts Group (MPEG) scheme where a correlation between pictures of a moving picture is used, a motion vector must be estimated for a block unit based on which motion compensation is performed. Conventionally, as a circuit which estimates this motion vector, a motion vector estimating circuit which is capable of reducing the information amount of the motion vector has been proposed (for example, refer to Patent Reference 1).

FIG. 1 is a block diagram showing the structure of a conventional motion vector estimating circuit. As shown in FIG. 1, this motion vector estimating circuit includes: frame memories 61 and 62, a motion vector storage memory 63, an inter-block difference arithmetic unit 64, an addition amount arithmetic unit 65, and a comparator 66. Here, the inter-block difference arithmetic unit 64 includes two hundred and fifty-six inter-block difference arithmetic units 64a, 64b, . . . 64c, and the addition amount arithmetic unit 65 includes two hundred and fifty-six addition amount arithmetic units 65a, 65b, . . . 65c. They perform two hundred and fifty-six searches.

First, the inter-block difference arithmetic unit 64a calculates a difference between an original macroblock (hereinafter referred to as original MB) to be inputted from the frame memory 62 and a search macroblock (hereinafter referred to as search MB) to be inputted from the frame memory 61, and outputs it as a differential amount. In addition, the inter-block difference arithmetic unit 64b outputs a differential amount between the same original MB as the one used in the inter-block difference arithmetic unit 64a and a search MB shifted by one from that used in the inter-block difference arithmetic unit 64a. Similarly, the 256th inter-block difference arithmetic unit 64c outputs a differential amount between the same original MB as the one used in the inter-block difference arithmetic unit 64a and the shifted search MB. Subsequently, each of the addition amount arithmetic circuits 65a, 65b, . . . 65c outputs a corrected differential amount by adding an addition amount to the corresponding differential amount, and codes a motion vector by the corrected differential amount of a neighboring macroblock. Next, the comparator 66 determines the optimum motion vector having the highest correlation between the original MB and the search MB. At this time, in the addition amount arithmetic circuit, the addition amount is determined depending on respective horizontal components and vertical components that motion vectors have and the coded status. More specifically, when it is assumed that the motion vector Vn at nth search point is Vn=(vnx, vny) and the previous motion vector PV determined through motion search of the immediately-previous search macroblock stored in the motion storage memory 63 is PV=(pvx, pvy), the addition amount Addn of the block differential amount is obtained by the following Equation.

$$Addn = \alpha \cdot (|vnx - pvx| + |vny - pvy|)$$

Here, α represents a constant, and | | represents calculation for obtaining an absolute value. The addition amount is set so as to become greater as the variance from the previous block motion vector becomes greater. Subsequently, the motion vector is coded according to the corrected differential amount corrected by the previous motion vector of the left neighboring search MB in a picture.

Patent Reference 1: Japanese Laid-open Patent Application No. 2001-197501

DISCLOSURE OF INVENTION

Problems that Invention is to Solve

In a conventional motion vector estimation, the sum of absolute difference in luminance between each pixel of an original MB and each pixel of a search MB is calculated as an evaluation value, and a motion vector is calculated by calculating the location of the search MB which provides the smallest evaluation value. In this conventional method, the bit amount related to the motion vector cannot be changed when the motion vector is coded at a low bit rate, and thus the bit rate is reduced by reducing the bit amount related to the differential amount. Therefore, there is a problem that the image quality drastically deteriorates.

On the other hand, in the conventional example, an addition amount is calculated from the variation amount of the motion vector, in the search location, with respect to the motion vector estimated in the past, a motion vector is calculated by calculating the location of the search MB which provides the smallest evaluation value to which this addition amount has been added, and calculates a point which provides the optimum bit rates respectively related to the motion vector and the differential amount.

However, it is difficult to employ a pipeline structure because, in this method, the motion vector estimated in the past for use in determining the addition amount and the coded status must be determined in advance.

The present invention has been made considering the above circumstances, and has an object to provide a motion vector estimating device which is capable of calculating the optimum motion vector by a trade-off between the bit amount of the motion vector and the differential amount and estimating a motion vector at high speed in a pipeline structure and a motion vector estimating method of the same.

Means to Solve the Problems

In order to achieve the above-described object, the motion vector estimating device according to the present invention segments an input picture into blocks of a predetermined size and estimates a motion vector of each of the input blocks, with respect to a reference picture through an n-stage pipeline processing where n is a natural number of 2 or more. The device includes: a first motion vector estimating unit which calculates an evaluation value on a per search block basis, based on the amount of distortion and a correction value, and estimate a first motion vector of an input block based on the location of the input block and the location of the search block which provides the smallest evaluation value. The amount of distortion is calculated using each of a plurality of search blocks of the predetermined size in a predetermined search area in the reference picture and the input block, and the correction value is calculated based on a motion vector with respect to each search block, a first prediction vector and a weighting coefficient. The device includes a k+1th motion vector estimating unit which estimates a k+1th motion vector of the input block based on the location of the input block and the location of the search block which provides the smallest evaluation value, by determining the amount of distortion as an evaluation value. The amount of distortion is calculated, on a per search block basis, using the input block and a plurality of search blocks in a predetermined search area having, as a center, a location identified by a kth motion vector estimated by a kth motion vector estimating unit where k is a natural number between 1 to n−1 inclusive. The device includes a first prediction vector generating unit which generates the first prediction vector based on a first motion vector of another input block which has been previously estimated by the first motion vector estimating unit, and notifies the first motion vector estimating unit of the generated first prediction vector.

This makes it possible to realize a pipeline structure and estimate a motion vector at high speed even in the case where the device is structured so that the first motion vector estimating unit estimates the motion vector based on the evaluation value obtained by adding a correction value to a distortion amount. In addition, it becomes possible to calculate the optimum motion vector by a trade-off between the bit amount of the motion vector and the differential amount by estimating the motion vector based on the evaluation value obtained by adding a correction value to a distortion amount.

In addition, the first prediction vector generating unit may notify the k+1th motion vector estimating unit of the generated first prediction vector, and the k+1th motion vector estimating unit may calculate the evaluation value based on: the amount of distortion; and a correction value calculated from a motion vector with respect to each search block, the first prediction vector and a weighting coefficient.

This makes it possible to realize a pipeline structure and estimate a motion vector at high speed similarly to the above even in the case where the device is structured so that the k+1th motion vector estimating unit, in addition to the first motion vector estimating unit, estimates the motion vector based on the evaluation value obtained by adding a correction value to a distortion amount. In addition, it becomes possible to simplify the structure of the device by allowing each motion vector estimating unit to use the first prediction vector when calculating the correction value.

In addition, the first motion vector estimating unit and the k+1th motion vector estimating unit may estimate the motion vectors on an input block basis or on an input sub-block basis. The sub-block is obtained by segmenting each input block into predetermined sizes.

This allows each motion vector estimating unit to estimate motion vectors not only on a per input block basis but also on a per input sub-block basis.

In addition, the motion vector estimating device may further include a k+1th prediction vector generating unit which generates a k+1th prediction vector based on a k+1th motion vector of another input block which has been previously estimated by the k+1th motion vector estimating unit and notifies the k+1th motion vector estimating unit of the generated k+1th prediction vector. The k+1th motion vector estimating unit may calculate the evaluation value based on the amount of distortion, a motion vector with respect to each search block, the k+1th prediction vector and a weighting coefficient.

This makes it possible to realize a pipeline structure and estimate a motion vector at high speed even in the case where the device is structured so that the k+1th motion vector estimating unit, in addition to the first motion vector estimating unit, estimates the motion vector based on the evaluation value obtained by adding a correction value to a distortion amount. In addition, it becomes possible to calculate the optimum motion vector by allowing each motion vector estimating unit to estimate the motion vector based on the evaluation value obtained by adding the correction value to the distortion amount.

Note that the present invention can be realized not only as a motion vector estimating device like this, but also as a motion vector estimating method having the steps corresponding to the unique units which this motion vector estimating device has and as a program which causes a computer to execute these steps.

EFFECTS OF THE INVENTION

As clear from the above description, with the motion vector estimating device and the motion vector estimating method according to the present invention, it becomes possible to calculate the optimum motion vector by a trade-off between the bit amount of the motion vector and the differential amount, and estimate a motion vector at high speed in a pipeline structure.

Figure 1:
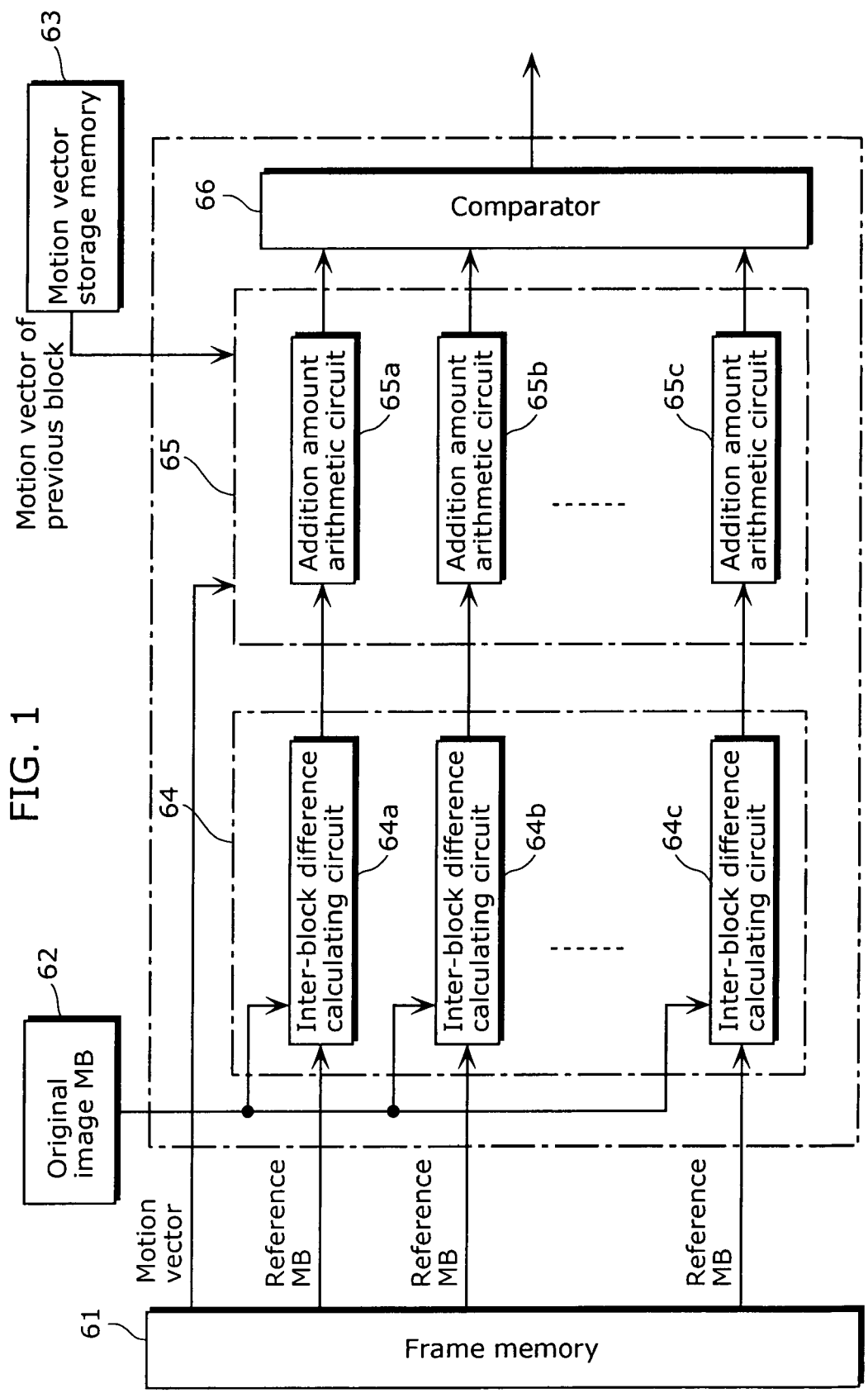
FIG. 1 is a block diagram showing the structure of a conventional motion vector estimating circuit.

NUMERICAL REFERENCES 101, 201, 301 and 401 Frame memories
102, 201, 302 and 402 First motion estimating units
103 and 303 Weighting coefficient calculating units
104 and 304 Prediction vector generating units
105, 205, 305 and 405 Second motion vector estimating units
111 and 408 Motion vector storing units
203 and 403 First weighting coefficient calculating units
204 and 404 First prediction vector generating units
206 and 406 Second weighting coefficient calculating units
207 and 407 Second prediction vector generating units

BEST MODE FOR CARRYING OUT THE INVENTION

Embodiments of the present invention will be described respectively below with reference to the drawings.

First Embodiment

Figure 2:
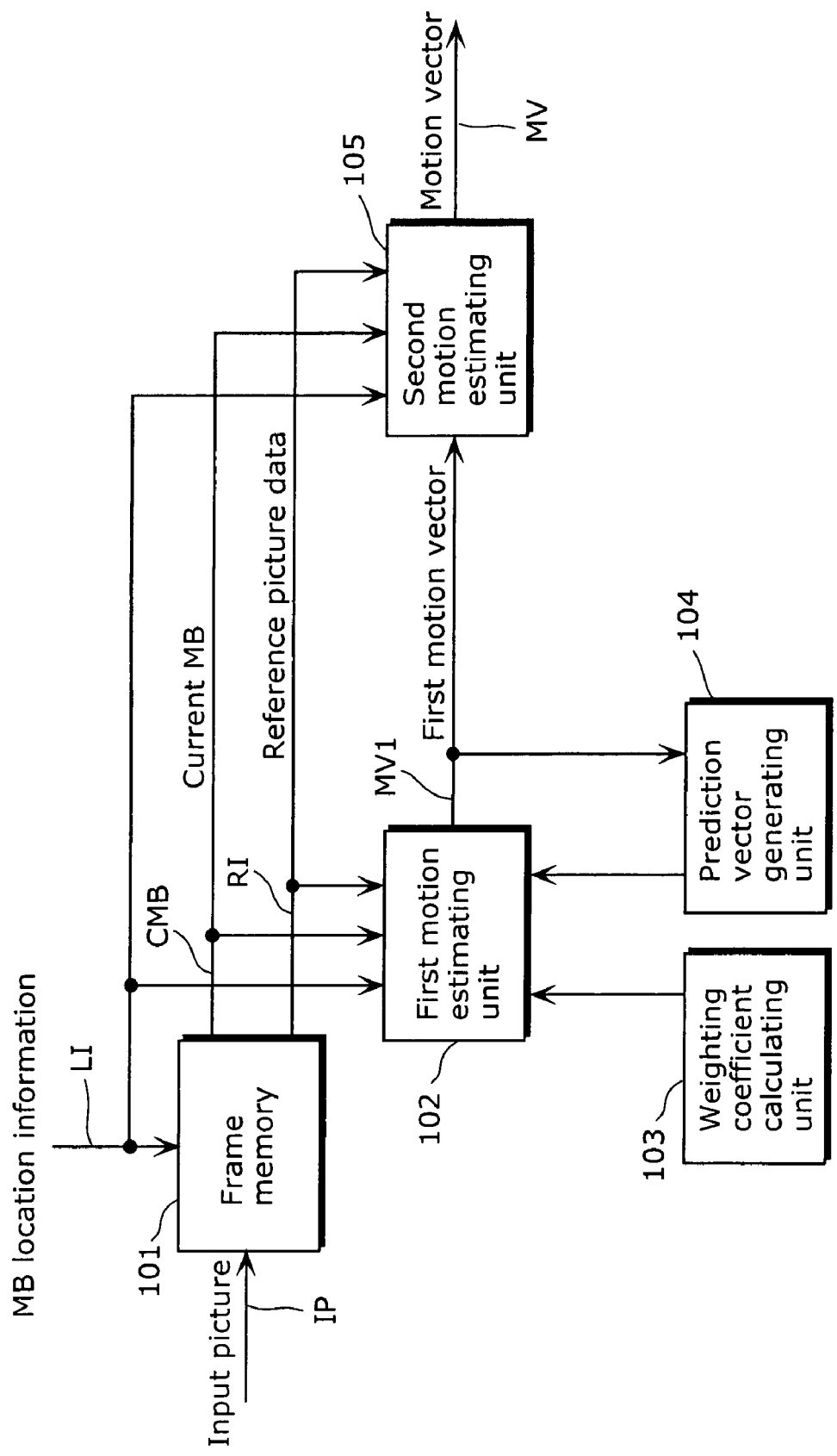
FIG. 2 is a block diagram showing the structure of a motion vector estimating device according to a first embodiment of the present invention.

FIG. 2 is a block diagram showing the structure of the motion vector estimating device according to a first embodiment of the present invention.

The motion vector estimating device 100 is for estimating a motion vector in a two-stage pipeline. As shown in FIG. 2, it includes: a frame memory 101, a first motion estimating unit 102, a weighting coefficient calculating unit 103, a prediction vector generating unit 104, and a second motion vector estimating unit 105. Here, it is assumed that the first motion estimating unit 102 searches for a motion vector with an integer pixel accuracy and that the second motion estimating unit 105 searches for a motion vector in a search area having, as the center, the first motion vector MV1 estimated by the first motion estimating unit 102 with a sub-pixel accuracy. In addition, it is assumed in this example that a unit based on which motion estimation is performed is a macroblock of a block size of 16×16 pixels and that a reference picture is one frame. Additionally, a description is made as to an example of performing coding according to the MPEG-2 scheme.

Figure 3:
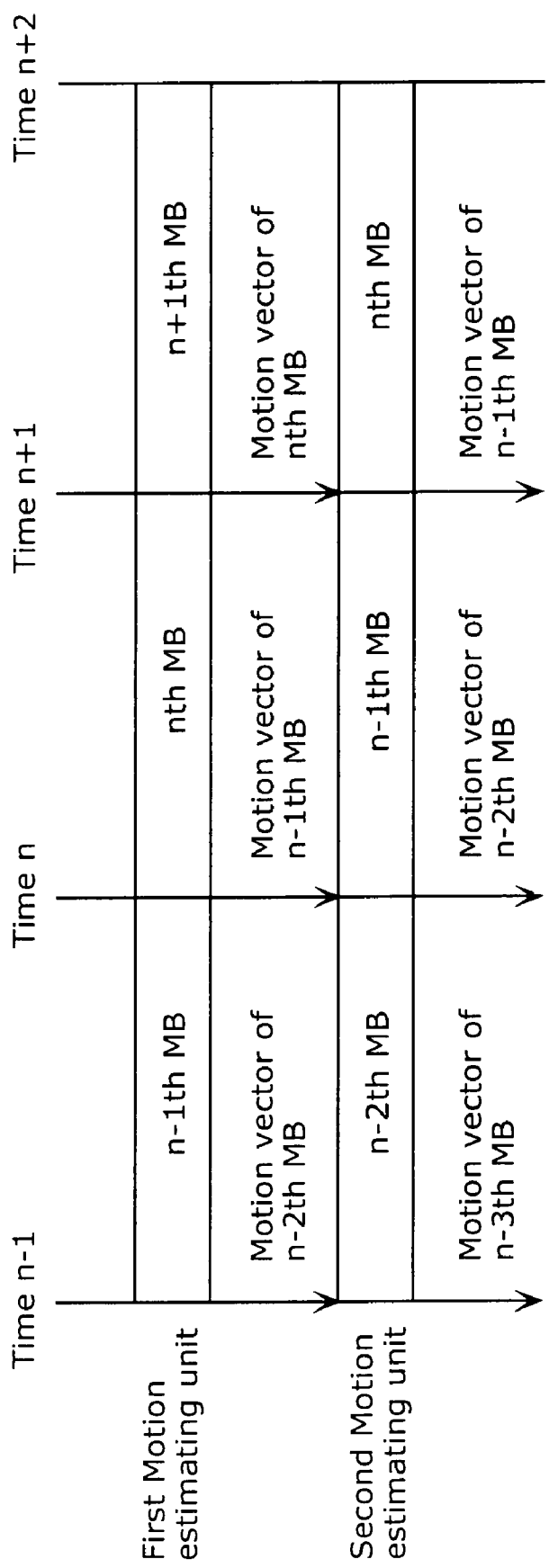
FIG. 3 is a diagram for illustrating a concept of motion vector estimation in a two-stage pipeline structure.

First, a description is made as to a concept in the case of estimating a motion vector in a two-stage pipeline structure with reference to FIG. 3.

In the case of estimating a motion vector on a per macroblock basis, it segments an input picture IP in the vertical and horizontal directions respectively on a per 16 pixel basis, and estimates a motion vector which shows a motion with respect to a reference picture of a current macroblock CMB to be coded on a per macroblock basis in a raster scan order assuming that the top left macroblock in a picture is the current macroblock to be coded. At this time, at a time point n, the first motion estimating unit 102 outputs a motion vector of the n−1th current macroblock to be coded with an integer accuracy, and starts estimating a motion vector of the nth current macroblock CMB to be coded with an integer accuracy. At the time point n, the second motion estimating unit 105 outputs a motion vector of the n−2th current macroblock CMB to be coded with a sub-pixel accuracy, and starts estimating a motion vector of the n−1th macroblock CMB with a sub-pixel accuracy. In this way, in the case of a pipeline structure, it is possible to run two motion estimating units in parallel, and thus it becomes possible to approximately double the performance.

The frame memory 101 outputs, as the current macroblock CMB to be coded, luminance data of the input picture IP on a per macroblock basis based on MB location information LI which is the location information of the current macroblock CMB to be coded. In addition, the frame memory 101 stores, as a reference picture, the image data which has been subjected to estimation of a motion vector MV and motion compensation, outputs the luminance data of the reference picture as reference picture data RI for each search area based on which a motion vector MV is estimated, in accordance with the MB location information LI.

The first motion estimating unit 102 selects, from the reference picture data RI, the reference macroblock of the identical block size and the highest correlation to the current macroblock CMB to be coded, calculates a motion vector of the current macroblock CMB to be coded based on the location of the reference macroblock and the MB location information LI, and outputs it as the first motion vector MV1. The first motion estimating unit 102 calculates the sum of absolute difference between the pixels of search macroblocks and the pixels of current macroblocks CMB to be coded in searching motion vectors. Each of the search macroblocks is shifted on a per pixel basis starting with the top left one in the search area in the raster scan order. The value obtained by adding a later-described correction value to this total sum is determined as an evaluation value. The macroblock in the search location which provides the smallest evaluation value is determined as the reference macroblock.

The second motion estimating unit 105 estimates a motion vector similarly to the first motion estimating unit 102. However, it searches a search area with a sub-pixel accuracy. The center of the search area is not the location of the current macroblock CMB to be coded, the center is the integer pixel location indicated by the first motion vector MV1 outputted from the first motion estimating unit 102. The second motion estimating unit 105 estimates a motion vector determining, as the evaluation value, only the amount of distortion which is the sum of the absolute difference of the pixels of the respective search macroblocks and the pixels of the current macroblock CMB to be coded. In this embodiment, a motion vector is searched for with a sub-pixel accuracy in an area which has, as the center, the motion vector estimated with an integer pixel accuracy. Since a small area such as a neighboring eight and a half pixel location of an integer pixel location, variations in correction value corresponding to coding amount of a motion vector is small. Therefore, the motion estimating unit 105 determines only the amount of distortion as an evaluation value.

Next, a description is made as to a correction value used by the first motion estimating unit 102. As described earlier, the sum of absolute difference of the pixels is a part corresponding to the amount of distortion of a difference macroblock, a correction value is the part corresponding to the coded amount of a motion vector. In the MPEG-2 standard, when a motion vector is coded, the differential amounts between the respective components of the motion vector (prediction vector) determined depending on the coding mode (Intra/Inter coding) of the left neighboring macroblock. Considering this, a correction value is calculated from the following Equation 1.

Correction value=λ×(|vmx−pmvx|)+(|vmy−pmvy|)

Here, λ represents a weighting coefficient, Vm=(vmx, vmy) represents the motion vector in mth search area, Pmv1= (pmvx, pmvy) represents the first prediction vector which is the motion vector of the left neighboring macroblock, and | | represents an absolute value calculation.

The weighting coefficient λ is a value calculated by the weighting coefficient calculating unit 103. The weighting coefficient calculating unit 103 calculates a weighted coefficient λ according to a method such as using a quantized value Q as it is and modifying it (for example, $0.85 \times Q^2$). Note that, the weighted coefficient λ may be a fixed value such as 4 in the case of a P picture and 8 in the case of a B picture.

The first prediction vector Pmv1 is generated by the prediction vector generating unit 104 based on the first motion vector MV1 having an integer accuracy outputted from the first motion vector estimating unit 102. In the case of the MPEG-2 standard, the first motion vector MV1 of the n−1th current macroblock CMB to be coded outputted at a time point n is determined as the first prediction vector Pmv1 of the nth current macroblock CMB to be coded. Note that the first motion estimating unit 102 calculates a correction value determining the respective components of the first prediction vector Pmv1 as 0 in the case where the current macroblock CMB to be coded is located in the left end of an input picture IP.

As described above, it is possible to realize a pipeline structure and estimate a motion vector at high speed by using the first prediction vector Pmv1 based on the first motion vector MV1 of the left neighboring macroblock for calculation of a correction value when the first motion estimating unit 102 estimates a motion vector based on the evaluation value obtained by adding a correction value to the amount of distortion.

Figure 4A:
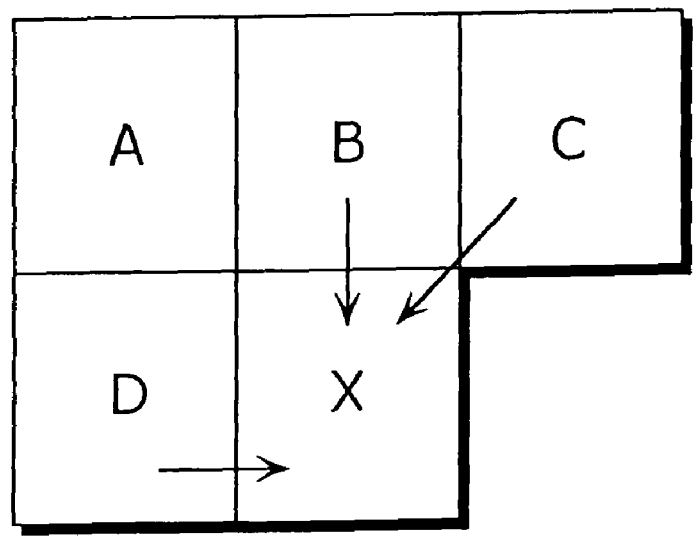
FIGS. 4A and 4B each is a diagram illustrating a prediction vector determination where motion vectors of neighboring macroblocks are used.
Figure 4B:
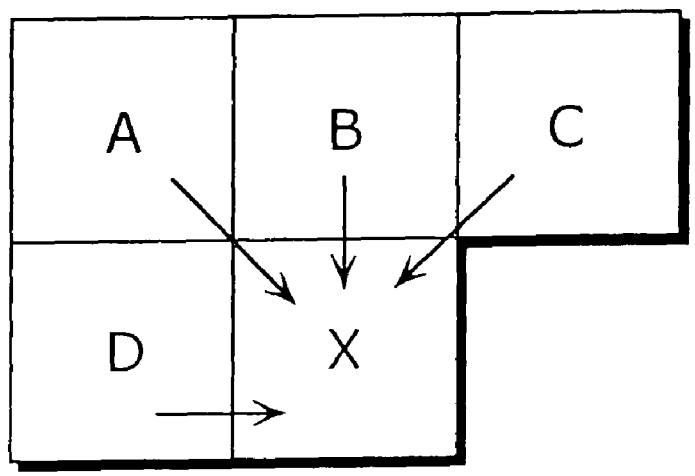
Figure 5:
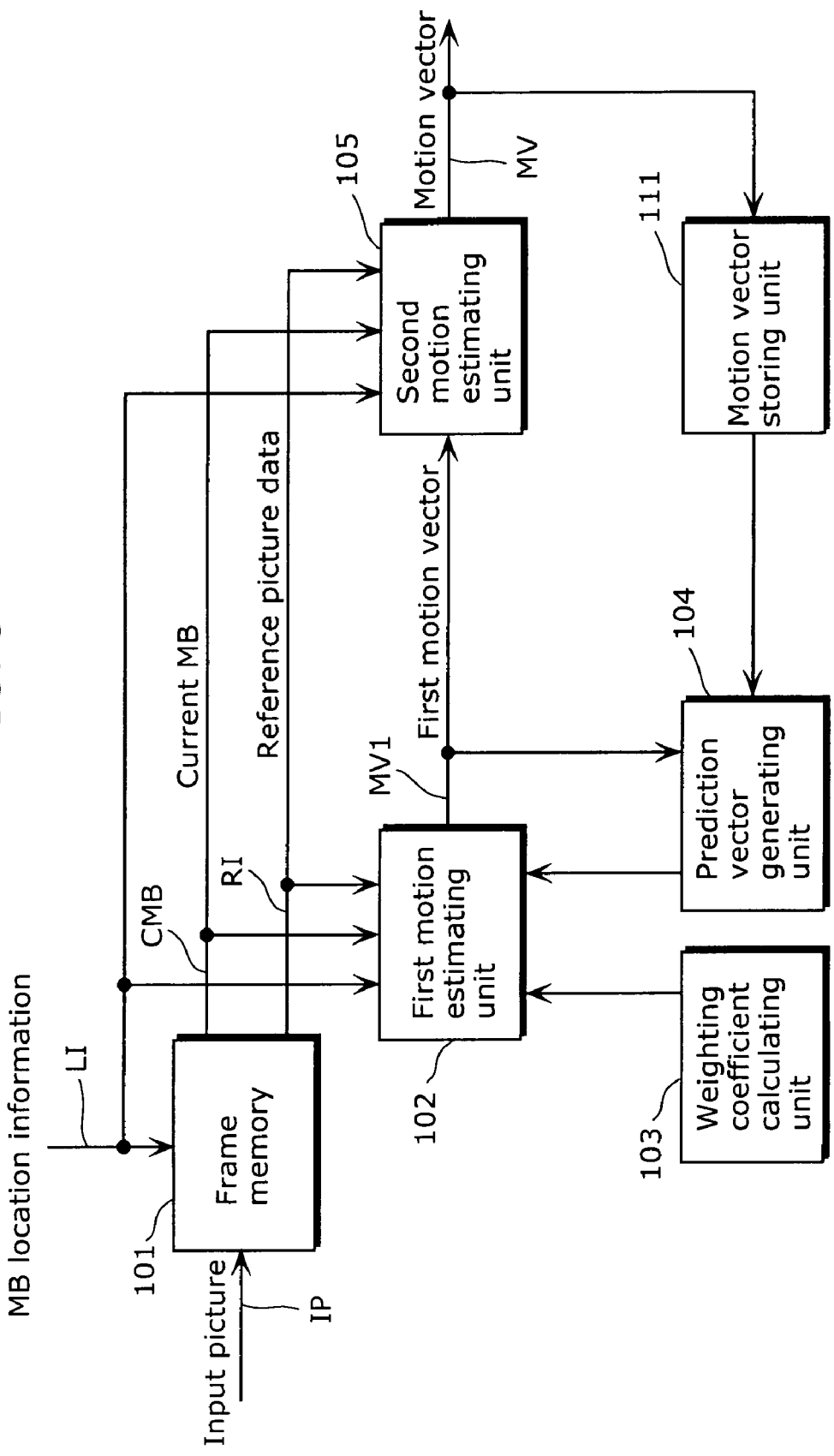
FIG. 5 is a block diagram showing the structure of a variation of a motion vector estimating device according to the first embodiment of the present invention.

Note that the prediction vector generating unit 104 is capable of determining the first prediction vector Pmv1 using motion vectors of neighboring macroblocks instead of using the first motion vector MV1 of the left neighboring macroblock as the first prediction vector Pmv1. For example, the followings are determined first prediction vectors Pmv1: as shown in FIG. 4A, the median value of the respective components of the motion vectors of the three macroblocks B, C and D located above, above right and left of the current macroblock to be coded; and as shown in FIG. 4B, the average value of the respective components of the motion vectors of the four macroblocks A, B, C and D located above left, above, above right and left of the current macroblock X to be coded, the average value or the median value of the respective components of the motion vectors of the neighboring macroblocks which point in the most dominant direction among the directions pointed by the motion vectors. In this case, it includes a motion vector storing unit in addition to the above structure, as shown in FIG. 5, and stores the motion vector estimated in the second motion estimating unit 105 in advance. This allows the prediction vector generating unit 104 to determine the first prediction vector Pmv1 using the motion vectors of the neighboring macroblocks in addition to the first motion vector MV1 estimated by the first motion estimating unit 102.

In addition, when the first motion estimating unit 102 estimates plural types of motion vectors including frame vectors and field vectors which may be taken by a macroblock in parallel, the prediction vector generating unit 104 is capable of fixedly or adaptively switching between a frame vector and a field vector and outputting it as the first prediction vector Pmv1.

In addition, it is assumed in this embodiment that the number of pipeline stages is two, the block size based on which a motion vector is estimated is 16×16 pixels, and the number of reference pictures is 1. However, it is possible to structure a similar embodiment using three or more pipeline stages, a different block size, and two or more reference pictures. In the case of employing an n-stage pipeline structure (n is an integer of 3 or more), it is structured so that a motion vector is estimated using an evaluation value obtained by adding a correction value to the amount of distortion in the case of 1st to kth-stage (k is a natural number between 1 to n−1 inclusive), and a motion vector is estimated using only the amount of distortion in the case of k+1th stage and the subsequent stages.

The amount of distortion is determined as the sum of absolute difference using the evaluation value in estimating a motion vector. However, a square error difference or a value of variance or the like can be used.

Second Embodiment

In the first embodiment, a motion vector is estimated based on an evaluation value obtained by adding a correction value to the amount of distortion in the first-stage motion estimating unit, and a motion vector is estimated determining the amount of distortion as an evaluation value in the second-stage motion estimating unit. However, in this embodiment, a description is made as to a case where a motion vector is estimated based on an evaluation value obtained by adding a correction value to the amount of distortion in the first-stage and second-stage motion estimating units.

Figure 6:
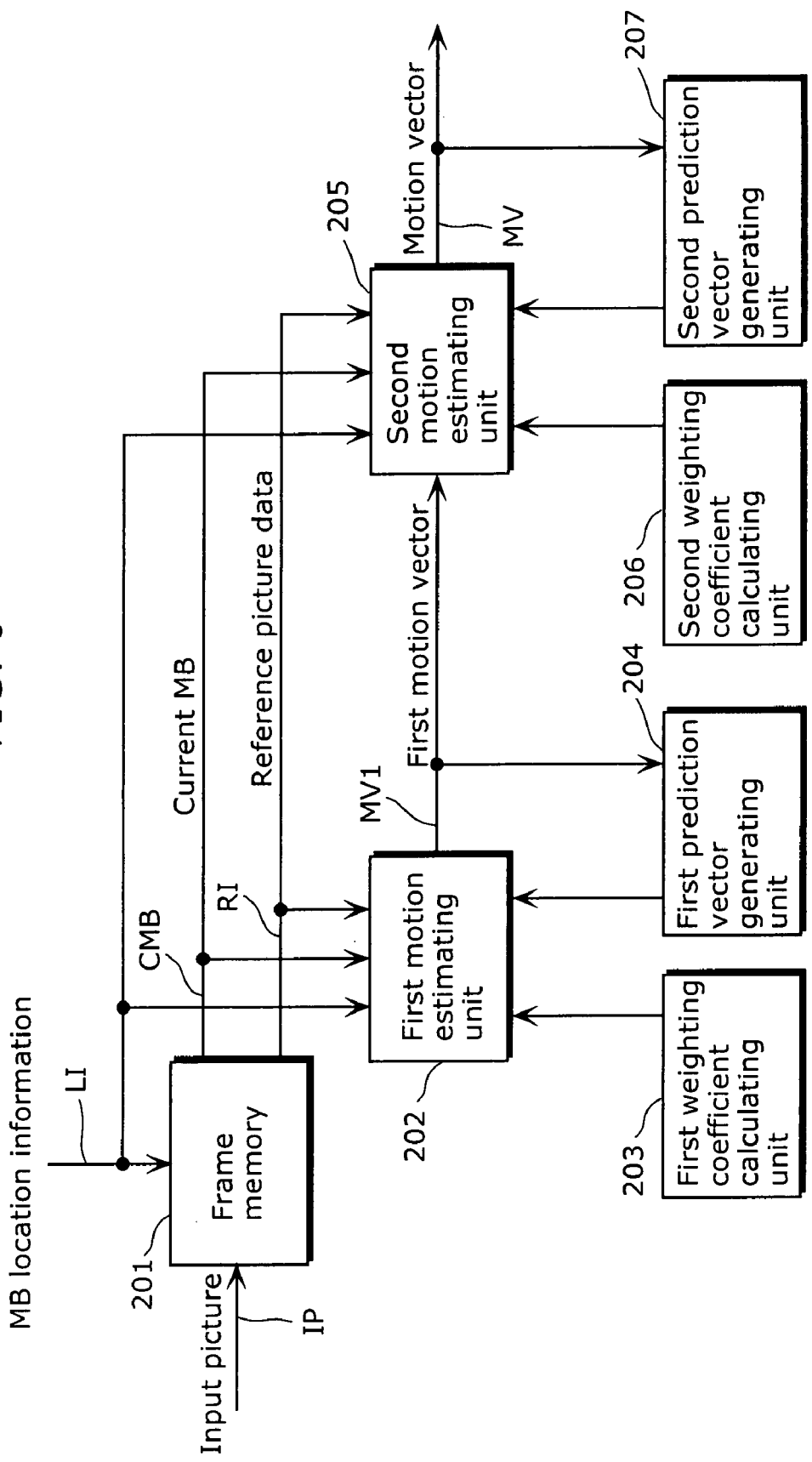
FIG. 6 is a block diagram showing the structure of a motion vector estimating device according to a second embodiment of the present invention.

FIG. 6 is a block diagram showing the structure of the motion vector estimating device according to a second embodiment of the present invention.

The motion vector estimating device 200 is for estimating a motion vector in a two-stage pipeline. As shown in FIG. 6, it includes: a frame memory 201, a first motion estimating unit 202, a weighting coefficient calculating unit 203, a first prediction vector generating unit 204, a second motion vector estimating unit 205, a second weighting coefficient calculating unit 206, and a second prediction vector generating unit 207. Here, it is assumed that the first-stage motion estimating unit 202 searches for a motion vector with an integer pixel accuracy similarly to the first embodiment, and that the second-stage motion estimating unit 205 searches for a motion vector in the search area having, as the center, the first motion vector MV1 estimated by the first motion estimating unit 202 with a sub-pixel accuracy. In addition, it is assumed in this example that a unit based on which motion estimation is performed is a macroblock of a block size of 16×16 pixels and that a reference picture is one frame. Additionally, a description is made as to an example of performing coding according to the MPEG-2 scheme.

This embodiment includes a second motion estimating unit 205, a second weighting coefficient calculating unit 206 and a second prediction vector generating unit 207, which are structural differences from the first embodiment.

Similarly to the first motion estimating unit 202, the second motion estimating unit 205 calculates a motion vector of a current macroblock CMB to be coded from a macroblock in the reference location which provides the smallest evaluation value and the MB location information LI by determining, as an evaluation value in searching a motion vector, the value obtained by adding a correction value corresponding to the coding amount of the motion vector to the amount of distortion which is the sum of absolute difference of pixels, and outputs the motion vector. At this time, the second motion estimating unit 205 uses the value calculated using the above Equation 1 as the correction value.

The second weighting coefficient calculating unit 206 calculates a weighting coefficient λ according to a method such as using a quantized value Q as it is and modifying it (for example, $0.85 \times Q^2$). Note that, the weighted coefficient λ may be a fixed value such as 4 in the case of a P picture and 8 in the case of a B picture.

The second prediction vector generating unit 207 generates a second prediction vector Pmv2 based on the motion vector having a sub-pixel accuracy outputted from the second motion estimating unit 205. In the case of the MPEG-2 standard, the motion vector of the n−1th current macroblock CMB to be coded outputted at a time point n is determined as the second prediction vector Pmv2 of the nth current macroblock CMB to be coded. Note that the second motion estimating unit 205 calculates a correction value determining the respective components of the second prediction vector Pmv2 as 0 in the case where the current macroblock CMB to be coded is located in the left end of an input picture IP.

As described above, it is possible to realize a pipeline structure and estimate a motion vector at high speed by: using the prediction vector based on the motion vector of the left neighboring macroblock for calculation of a correction value when the first motion estimating unit 202 estimates a motion vector based on the evaluation value obtained by adding a correction value to the amount of distortion; and using the prediction vector based on the motion vector of the left neighboring macroblock for calculation of a correction value when the second motion estimating unit 205 estimates a motion vector based on the evaluation value obtained by adding a correction value to the amount of distortion Note that the second prediction vector generating unit 207 is capable of determining the second prediction vector Pmv2 using the motion vectors of neighboring macroblocks instead of using the motion vector of the left neighboring macroblock as the second prediction vector Pmv2, similarly to the description in the first embodiment. For example, the followings are determined as the second prediction vectors Pmv2: as shown in FIG. 4A, the median value of the respective components of the motion vectors of the three macroblocks B, C and D located above, above right and left of the current macroblock to be coded; and as shown in FIG. 4B, the average value of the respective components of the motion vectors of the four macroblocks A, B, C and D located above left, above, above right and left of the current macroblock X to be coded, the average value or the median value of the respective components of the motion vectors which are of the neighboring macroblocks and in the motion vector direction which is most dominant. In this case, it includes a motion vector storing unit in addition to the above structure, and stores the motion vector estimated in the second motion estimating unit 205 in advance. This allows the prediction vector generating unit 207 to determine the second prediction vector Pmv2 using the motion vectors of the neighboring macroblocks in addition to the motion vector estimated by the second motion estimating unit 205.

In addition, when the second motion estimating unit 205 estimates plural types of motion vectors including frame vectors and field vectors which may be taken by a macroblock in parallel, the second prediction vector generating unit 207 is capable of fixedly or adaptively switching between a frame vector and a field vector and outputting it as the second prediction vector Pmv.

In addition, it is assumed in this embodiment that the number of pipeline stages is two, the block size based on which a motion vector is estimated is 16×16 pixels, and the number of reference pictures is 1. However, it is possible to structure a similar embodiment using three or more pipeline stages, a different block size, and two or more reference pictures. In the case of employing an n-stage pipeline structure (n is an integer of 3 or more), it is structured so that a motion vector is estimated using an evaluation value obtained by adding a correction value to the amount of distortion in the case of 1st to kth-stage (k is a natural number between 1 to n−1 inclusive), and a motion vector is estimated using only the amount of distortion in the case of k+1th stage and the subsequent stages.

The amount of distortion is determined as the sum of absolute difference using the evaluation value in estimating a motion vector. However, a square error difference or a value of variance or the like can be used.

Third Embodiment

In the second embodiment, a correction value is calculated using a prediction vector generated by the prediction vector generating unit when a motion vector is estimated based on an evaluation value obtained by adding a correction value to the amount of distortion in the first-stage and second-stage motion estimating unit. However, in this embodiment, a description is made as to a case where a common prediction vector is used when a correction value is calculated in the first-stage and second-stage motion estimating units.

Figure 7:
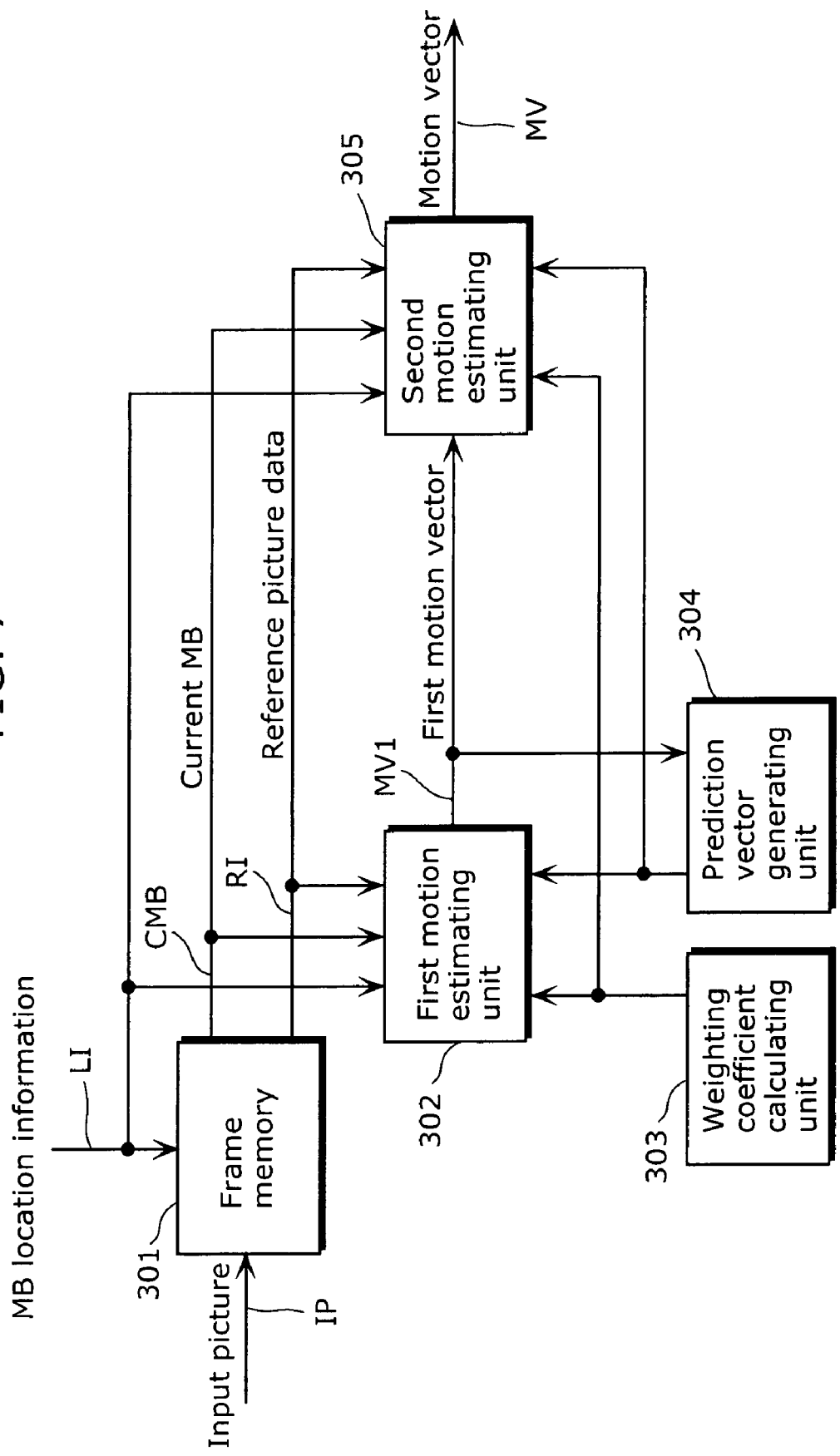
FIG. 7 is a block diagram showing the structure of a motion vector estimating device according to a third embodiment of the present invention.

FIG. 7 is a block diagram showing the structure of the motion vector estimating device according to a third embodiment of the present invention.

The motion vector estimating device 300 is for estimating a motion vector in a two-stage pipeline. As shown in FIG. 7, it includes: a frame memory 301, a first motion estimating unit 302, a weighting coefficient calculating unit 303, a prediction vector generating unit 304, and a second motion vector estimating unit 305. Here, it is assumed that the first-stage motion estimating unit 302 searches for a motion vector with an integer pixel accuracy similarly to the first embodiment, and that the second-stage motion estimating unit 305 searches for a motion vector in the search area having, as the center, the first motion vector MV1 estimated by the first motion estimating unit 302 with a sub-pixel accuracy. In addition, it is assumed in this example that a unit based on which motion estimation is performed is a macroblock of a block size of 16×16 pixels and that a reference picture is one frame. Additionally, a description is made as to an example of performing coding according to the MPEG-2 scheme.

This embodiment differs from the first embodiment in that the outputs of the weighting coefficient calculating unit 303 and the prediction vector generating unit 304 are inputted to the second motion estimating unit 305 in addition to the first motion estimating unit 302. Thus, a description is made as to this part; that is, a description is omitted as to the same parts as those of the first and second embodiments.

Similarly to the first motion estimating unit 302, the second motion estimating unit 305 calculates a motion vector of a current macroblock CMB to be coded from a macroblock in the reference location which provides the smallest evaluation value and the MB location information LI by determining, as an evaluation value in searching for a motion vector, the value obtained by adding a correction value corresponding to the coding amount of the motion vector to the amount of distortion which is the sum of absolute difference of pixels, and outputs the motion vector. At this time, the second motion estimating unit 305 uses the value calculated using the above Equation 1 as the correction value.

The weighting coefficient calculating unit 303 calculates a weighting coefficient $\lambda$ according to a method such as using a quantized value Q as it is and modifying it (for example, $0.85 \times Q^2$), and outputs the calculated weighting coefficient $\lambda$ to the first motion estimating unit 302 and the second motion estimating unit 305. Note that, the weighted coefficient $\lambda$ may be a fixed value such as 4 in the case of a P picture and 8 in the case of a B picture.

The prediction vector generating unit 304 generates a first prediction vector Pmv1 based on the first motion vector MV1 having an integer accuracy outputted from the first motion estimating unit 302, and outputs the generated first prediction vector Pmv1 to the first motion estimating unit 302 and the second motion estimating unit 305. In the case of the MPEG-2 standard, the motion vector of the n−1th current macroblock CMB to be coded outputted at a time point n is determined as the first prediction vector Pmv1 of the nth current macroblock CMB to be coded. Note that the first motion estimating unit 302 and the second motion estimating unit 305 calculate a correction value determining the respective components of the first prediction vector Pmv1 as 0 in the case where the current macroblock CMB to be coded is located in the left end of an input picture IP.

As described above, it is possible to realize a pipeline structure and estimate a motion vector at high speed by using the first prediction vector Pmv1 based on the first motion vector MV1 of the left neighboring macroblock for calculation of a correction value when the first motion estimating unit 302 and the second motion estimating unit 305 each estimates a motion vector based on the evaluation value obtained by adding a correction value to the amount of distortion. In addition, it is possible to simplify the structure by using a common first prediction vector Pmv1 when the first motion estimating unit 302 and the second motion estimating unit 305 calculate a correction value.

Note that the prediction vector generating unit 304 is capable of determining the first prediction vector Pmv1 using the motion vectors of neighboring macroblocks instead of using the motion vector of the left neighboring macroblock as the first prediction vector Pmv1, similarly to the description in the first embodiment. For example, the followings are determined as the first prediction vectors Pmv1: as shown in FIG. 4A, the median value of the respective components of the motion vectors of the three macroblocks B, C and D located above, above right and left of the current macroblock to be coded; and as shown in FIG. 4B, the average value of the respective components of the motion vectors of the four macroblocks A, B, C and D located above left, above, above right and left of the current macroblock X to be coded, the average value or the median value of the respective components of the motion vectors which are of the neighboring macroblocks and in the motion vector direction which is most dominant. In this case, it includes a motion vector storing unit in addition to the above structure, and stores the motion vector estimated in the second motion estimating unit 305 in advance. This allows the prediction vector generating unit 304 to determine the first prediction vector Pmv1 using the motion vectors of the neighboring macroblocks in addition to the first motion vector MV1 estimated by the first motion estimating unit 302.

In addition, when the first motion estimating unit 302 estimates plural types of motion vectors including frame vectors and field vectors which may be taken by a macroblock in parallel, the prediction vector generating unit 304 is capable of fixedly or adaptively switching between a frame vector and a field vector and outputting it as the first prediction vector Pmv1.

In addition, it is assumed in this embodiment that the number of pipeline stages is two, the block size based on which a motion vector is estimated is 16×16 pixels, and the number of reference pictures is 1. However, it is possible to structure a similar embodiment using three or more pipeline stages, a different block size, and two or more reference pictures. In the case of employing an n-stage pipeline structure (n is an integer of 3 or more), it is structured so that a motion vector is estimated using an evaluation value obtained by adding a correction value to the amount of distortion in the case of 1st to kth-stage (k is a natural number between 1 to n−1 inclusive), and a motion vector is estimated using only the amount of distortion in the case of k+1th stage and the subsequent stages.

The amount of distortion is determined as the sum of absolute difference using the evaluation value in estimating a motion vector. However, a square error difference or a value of variance or the like can be used.

Fourth Embodiment

In the first to third embodiments, a motion vector is estimated on a per macroblock basis in the first-stage and second-stage motion estimating units. However, in this embodiment, a description is made as to a case where a motion vector is estimated based on a macroblock or a block obtained by further segmenting the macroblock.

Figure 8:
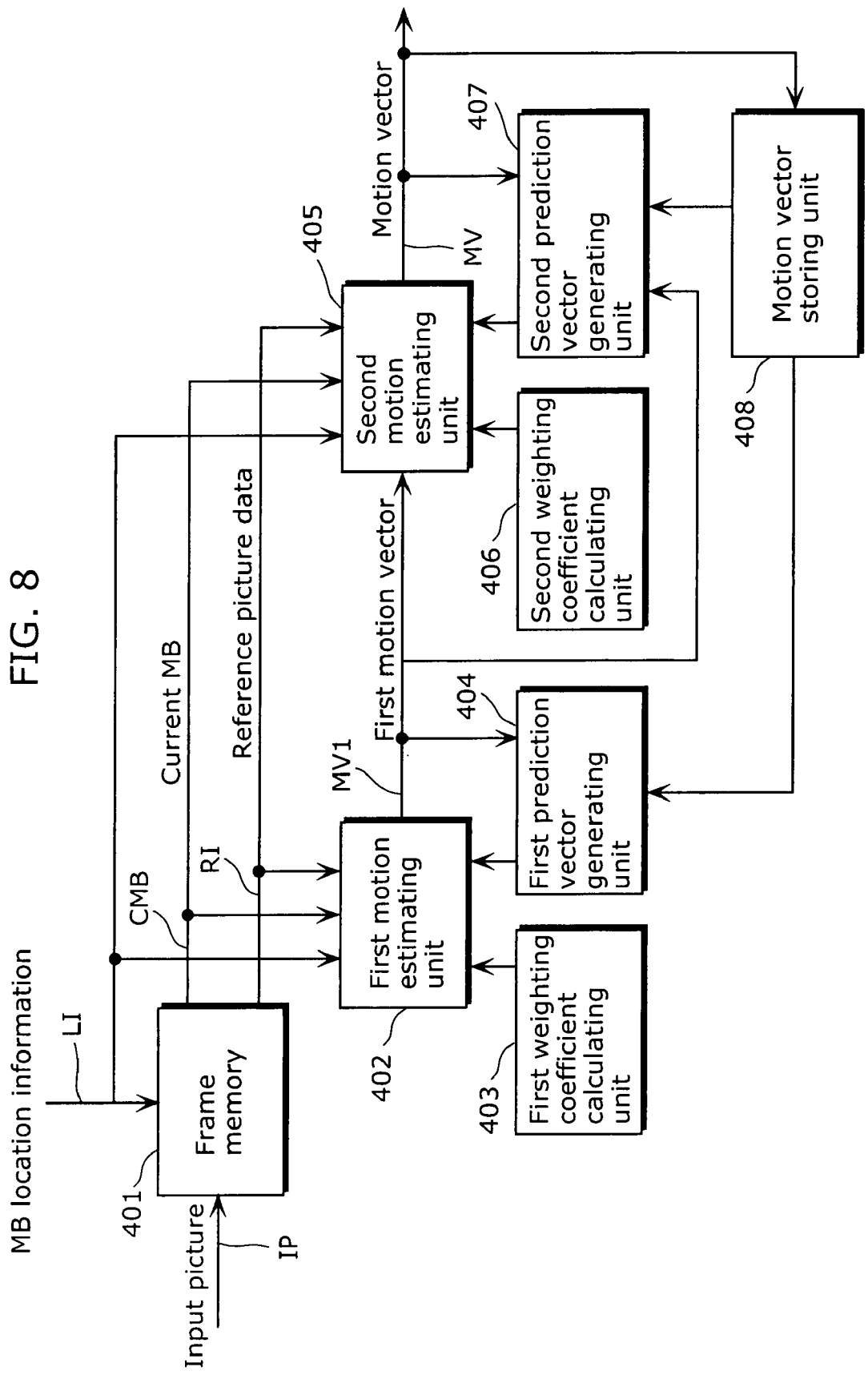
FIG. 8 is a block diagram showing the structure of a motion vector estimating device according to a fourth embodiment of the present invention.

FIG. 8 is a block diagram showing the structure of the motion vector estimating device according to a fourth embodiment of the present invention.

The motion vector estimating device 400 is for estimating a motion vector in a two-stage pipeline. As shown in FIG. 8, it includes: a frame memory 401, a first motion estimating unit 402, a weighting coefficient calculating unit 403, a prediction vector generating unit 404, and a second motion vector estimating unit 405, a second weighting coefficient calculating unit 406, a second prediction vector generating unit 407 and a motion vector storing unit 408. Here, it is assumed that the first-stage motion estimating unit 402 searches for a motion vector with an integer pixel accuracy similarly to the first embodiment, and that the second-stage motion estimating unit 405 searches for a motion vector in the search area having, as the center, the first motion vector MV1 estimated by the first motion estimating unit 402 with a sub-pixel accuracy. In addition, it is assumed in this example that a unit based on which motion estimation is performed is a macroblock of a block size of 16×16 pixels or the four blocks which are obtained by further segmenting the macroblock and is of a block size of 8×8 pixels, and that a reference picture is one frame. Additionally, a description is made as to an example of performing coding according to the MPEG-4 scheme.

This embodiment differs from the first to third embodiments in that the first motion estimating unit 402 and the second motion estimating unit 405 each estimates the motion vector of a block in addition to a macroblock. In addition, this embodiment differs in that the first motion estimating unit 402 and the second motion estimating unit 405 each calculates a correction value. A description is made as to the point; that is, a detailed description is omitted as to the same parts as those of the first to third embodiments.

The first motion estimating unit 402 calculates a first motion vector of a current macroblock CMB to be coded and the first motion vectors of these four blocks. In other words, the first motion vector estimating unit 402 calculates the first motion vector of the current macroblock CMB to be coded similarly to the first to third embodiments. In addition, the first motion estimating unit 402 calculates a motion vector of each block based on the block, in the reference location, having the smallest evaluation value and the MB location information LI by determining, as an evaluation value, the value obtained by adding a correction value to the amount of distortion which is the sum of absolute difference of pixels based on a search block of the same block size and in a reference picture data RI. At this time, the first motion estimating unit 402 uses the value calculated using the above Equation 1 as the correction value.

The prediction vector generating unit 404 generates a first prediction vector Pmv1 based on the first motion vector MV1 having an integer accuracy outputted from the first motion estimating unit 402, and outputs the generated first prediction vector Pmv1 to the first motion estimating unit 402. At this time, it is desirable that the vectors of the neighboring blocks be used as the prediction vectors of the four blocks. Since motion vector is estimated in a pipeline processing on a per macroblock basis, it is necessary to estimate motion vectors of these four blocks before the motion vector of the left neighboring block is not estimated. Therefore, it calculates a correction value by determining the second prediction vector Pmv2 as the motion vector of the left neighboring macroblock.

The second motion estimating unit 405 calculates an evaluation value similarly to the first motion estimating unit 402, and calculates the motion vector of the current macroblock CMB to be coded and the motion vectors of the four blocks.

The second prediction vector generating unit 407 calculates the median value of the motion vectors of the neighboring block locations defined in MPEG-4, based on the motion vector MV having a sub-pixel accuracy outputted from the second motion estimating unit 405 or the first motion vector MV1 having an integer accuracy outputted from the first motion estimating unit 402, and determining it as the second prediction vector Pmv2.

As described above, even in the case of estimating a motion vector based on a block obtained by segmenting a macroblock, it is possible to realize a pipeline structure and estimate a motion vector at high speed by using the first prediction vector Pmv1 based on the first motion vector MV1 of the left neighboring macroblock for calculation of a correction value in the first motion estimating unit 402 and by using the second prediction vector Pmv2 based on the motion vector MV or the first motion vector MV1 for calculation of a correction value in the second motion estimating unit 405.

Note that the first prediction vector generating unit 404 and the second prediction vector generating unit 407 are capable of determining provisional prediction vectors using motion vectors of the neighboring macroblocks as the first prediction vector Pmv1 and the second prediction vector Pmv2 instead of using the motion vector of the left neighboring block. For example, the followings are determined as the provisional prediction vectors: as shown in FIG. 4A, the median value of the respective components of the motion vectors of the three macroblocks B, C and D located above, above right and left of the current macroblock to be coded; and as shown in FIG. 4B, the average value of the respective components of the motion vectors of the four macroblocks A, B, C and D located above left, above, above right and left of the current macroblock X to be coded, the average value or the median value of the respective components of the motion vectors which are of the neighboring macroblocks and in the motion vector direction which is most dominant. In this case, the first prediction vector generating unit 404 may determine the second prediction vector Pmv2 using the motion vectors of the neighboring macroblocks stored in the motion vector storing unit 408 in addition to the first motion vector MV1 estimated by the first motion estimating unit 402.

In addition, when the first motion estimating unit 402 and the second motion estimating unit 405 each estimates plural types of motion vectors including frame vectors and field vectors which may be taken by a macroblock in parallel, the first prediction vector generating unit 404 and the second prediction vector generating unit 407 each is capable of fixedly or adaptively switching between a frame vector and a field vector and outputting them as the first prediction vector Pmv1 and the second prediction vector Pmv2.

In addition, it is assumed in this embodiment that the number of pipeline stages is two, the block size based on which a motion vector is estimated is 16×16 pixels and the sub-block size based on which a motion vector is estimated is 8×8 pixels, and the number of reference pictures is 1. However, it is possible to structure a similar embodiment using three or more pipeline stages, a different block size, and two or more reference pictures. In the case of employing an n-stage pipeline structure (n is an integer of 3 or more), it is structured so that a motion vector is estimated using an evaluation value obtained by adding a correction value to the amount of distortion in the case of 1st to kth-stage (k is a natural number between 1 to n−1 inclusive), and a motion vector is estimated using only the amount of distortion in the case of k+1th stage and the subsequent stages.

The amount of distortion is determined as the sum of absolute difference using the evaluation value in estimating a motion vector. However, a square error difference or a value of variance or the like can be used.

The functional blocks in the block diagrams shown as FIG. 2 and FIGS. 5 to 8 in the respective embodiments are typically achieved in the form of a Large Scale Integrated (LSI) circuit that is an integrated circuit. This LSI may be integrated into one chip, or may be integrated into plural chips (For example, the functional blocks other than a memory may be integrated into one chip). Here, it is called LSI, but it may also be called IC, system LSI, super LSI, or ultra LSI depending on the degree of integration.

Moreover, ways to achieve an integrated circuit are not limited to the use of the LSI. A special circuit or a general purpose processor and so forth may also be used for achieving the integration. A Field Programmable Gate Array (FPGA) that can be programmed or a reconfigurable processor that allows re-configuration of the connection or configuration of LSI may be used after LSI is manufactured.

Further, with advancement in technology of manufacturing semiconductors or other derivative technique, a new integration technology resulting in replacement of LSI may emerge. The integration may be carried out using this technology. Application of biotechnology is one such possibility.

INDUSTRIAL APPLICABILITY

As described above, a motion vector estimating device according to the present invention is capable of estimating a motion vector by a trade-off between the amount of distortion of an inter-block difference and the coding amount of the motion vector. The device is applicable to motion vector estimation and the like performed in a pipeline structure when video is coded in a mobile phone, a DVD device, a personal computer or the like.

The invention claimed is:

1. A motion vector estimating device which segments an input picture into blocks of a predetermined size and estimates a motion vector of each of the input blocks, with respect to a reference picture through an n-stage pipeline processing where n is a natural number of 2 or more, said device comprising:

a first motion vector estimating unit operable to calculate an evaluation value on a per search block basis, based on an amount of distortion and a correction value, and estimate a first motion vector of an input block based on a location of the input block and a location of a search block which provides a smallest evaluation value, the amount of distortion being calculated using each of a plurality of search blocks of the predetermined size in a predetermined search area in the reference picture and the input block, and the correction value being calculated based on a motion vector with respect to each search block, a first prediction vector and a weighting coefficient;

a k+1th motion vector estimating unit operable to estimate a k+1th motion vector of the input block based on a location of the input block and a location of the search block which provides a smallest evaluation value, by determining an amount of distortion as an evaluation value, the amount of distortion being calculated, on a per search block basis, using the input block and a plurality of search blocks in a predetermined search area having, as a center, a location identified by a kth motion vector estimated by a kth motion vector estimating unit where k is a natural number between 1 to n−1 inclusive; and a first prediction vector generating unit operable to generate the first prediction vector based on a first motion vector of another input block which has been previously estimated by said first motion vector estimating unit, and notify said first motion vector estimating unit of the generated first prediction vector.

2. The motion vector estimating device according to claim 1,
wherein said first prediction vector generating unit is operable to notify said k+1th motion vector estimating unit of the generated first prediction vector, and
said k+1th motion vector estimating unit is operable to calculate the evaluation value based on: the amount of distortion; and a correction value calculated from a motion vector with respect to each search block, the first prediction vector and a weighting coefficient.

3. The motion vector estimating device according to claim 1,
wherein said first motion vector estimating unit and said k+1th motion vector estimating unit are operable to estimate the motion vectors on an input block basis or on an input sub-block basis, the sub-block being obtained by segmenting each input block into predetermined sizes.

4. The motion vector estimating device according to claim 1,
wherein the amount of distortion is one of the sum of absolute difference, variance difference and square error difference which are calculated based on pixel values of pixels which constitute the input block and the search block.

5. The motion vector estimating device according to claim 1,
wherein said first prediction vector generating unit is operable to determine, as the first prediction vector, a first motion vector of another input block which has been previously estimated by said first motion vector estimating unit, and the input block being located immediately to a left of the first input block.

6. The motion vector estimating device according to claim 1,
wherein said first prediction vector generating unit is operable to determine, as the first prediction vector, one of an average value, a median value and a mode value of first motion vectors of one or more input blocks which have been previously estimated by said first motion vector estimating unit and are located adjacent to the first input block.

7. The motion vector estimating device according to claim 1, further comprising
a k+1th prediction vector generating unit operable to generate a k+1th prediction vector based on a k+1th motion vector of another input block which has been previously estimated by said k+1th motion vector estimating unit and notify said k+1th motion vector estimating unit of the generated k+1th prediction vector,
wherein said k+1th motion vector estimating unit is operable to calculate the evaluation value based on the amount of distortion, a motion vector with respect to each search block, the k+1th prediction vector and a weighting coefficient.

8. The motion vector estimating device according to claim 7,
wherein said k+1th prediction vector generating unit is operable to determine, as the k+1th prediction vector, a k+1th motion vector of the input block which has been previously estimated by said k+1th motion vector estimating unit and is located immediately to a left of the first input block.

9. The motion vector estimating device according to claim 7,
wherein said k+1th prediction vector generating unit is operable to determine, as the first prediction vector, one of an average value, a median value and a mode value of k+1th motion vectors of one or more input blocks which have been previously estimated by said k+1th motion vector estimating unit and is adjacent to the input block.

10. The motion vector estimating device according to claim 7,
wherein said first motion vector estimating unit and said k+1th motion vector estimating unit each is operable to calculate the weighting coefficient using a different calculating method.

11. The motion vector estimating device according to claim 7, wherein said first prediction vector generating unit and said k+1th prediction vector generating unit each is operable to generate the first prediction vector and the k+1th prediction vector using a different calculating method.

12. A motion vector estimating device which segments an input picture into blocks of a predetermined size and estimates a motion vector of each input block with respect to a reference picture through a two-stage processing, said device comprising:
a first motion vector estimating unit operable to calculate an evaluation value on a per search block basis, based on an amount of distortion and a correction value, and estimate a first motion vector of an input block based on a location of the input block and a location of a search block which provides a smallest evaluation value, the amount of distortion being calculated using each of a plurality of search blocks of the predetermined size in a predetermined search area in the reference picture and the input block, and the correction value being calculated based on a motion vector with respect to each search block, a first prediction vector and a weighting coefficient;
a second motion vector estimating unit operable to estimate a second motion vector of the input block based on a location of the input block and a location of the search block which provides a smallest evaluation value, by determining an amount of distortion as an evaluation value, the amount of distortion being calculated, on a per search block basis, using the input block and a plurality of search blocks in a predetermined search area having, as a center, a location identified by a first motion vector estimated by a first motion vector estimating unit; and
a first prediction vector generating unit operable to generate the first prediction vector based on a first motion vector of another input block which has been previously estimated by said first motion vector estimating unit, and notify said first motion vector estimating unit of the generated first prediction vector.

13. The motion vector estimating device according to claim 12, wherein:
said first motion vector estimating unit is operable to estimate the first motion vector with an integer accuracy; and
said second motion vector estimating unit is operable to estimate the second motion vector with a decimal accuracy.

14. The motion vector estimating device according to claim 13, further comprising
a second prediction vector generating unit operable to generate a second prediction vector based on a second motion vector of another input block which has been previously estimated by said second motion vector estimating unit, and notify said second motion vector estimating unit of the generated second prediction vector,
wherein said second motion vector estimating unit is operable to calculate the evaluation value based on: the amount of distortion; and a correction value calculated from a motion vector with respect to each search block, the second prediction vector and a weighting coefficient.

15. A motion vector estimating method for segmenting an input picture into blocks of a predetermined size and estimating a motion vector of each input block with respect to a reference picture through an n-stage pipeline processing where n is a natural number of 2 or more, said method comprising:
- a first motion vector estimating step of calculating an evaluation value on a per search block basis, based on an amount of distortion and a correction value, and estimating a first motion vector of an input block based on a location of the input block and a location of a search block which provides a smallest evaluation value, the amount of distortion being calculated using each of a plurality of search blocks of the predetermined size in a predetermined search area in the reference picture and the input block, and the correction value being calculated based on a motion vector with respect to each search block, a first prediction vector and a weighting coefficient;
- a k+1th motion vector estimating step of estimating a k+1th motion vector of the input block based on a location of the input block and a location of the search block which provides a smallest evaluation value, by determining an amount of distortion as an evaluation value, the amount of distortion being calculated, on a per search block basis, using the input block and a plurality of search blocks in a predetermined search area having, as a center, a location identified by a kth motion vector estimated in a kth motion vector estimating step where k is a natural number between 1 to n−1 inclusive; and
- a first prediction vector generating step of generating the first prediction vector based on a first motion vector of another input block which has been previously estimated in said first motion vector estimating step, and making a notification about the generated first prediction vector in said first motion vector estimating step.

16. A non-transitory computer-readable recording medium having recorded thereon a program for segmenting an input picture into blocks of a predetermined size and estimating a motion vector of each input block with respect to a reference picture through an n-stage pipeline processing where n is a natural number of 2 or more, said program causing a computer to execute:
- a first motion vector estimating step of calculating an evaluation value on a per search block basis, based on an amount of distortion and a correction value, and estimating a first motion vector of the input block based on a location of the input block and a location of a search block which provides a smallest evaluation value, the amount of distortion being calculated using each of a plurality of search blocks of the predetermined size in a predetermined search area in the reference picture and the input block, and the correction value being calculated based on a motion vector with respect to each search block, a first prediction vector and a weighting coefficient;
- a k+1th motion vector estimating step of estimating a k+1th motion vector of the input block based on a location of the input block and a location of the search block which provides a smallest evaluation value, by determining an amount of distortion as an evaluation value, the amount of distortion being calculated, on a per search block basis, using the input block and a plurality of search blocks in a predetermined search area having, as a center, a location identified by a kth motion vector estimated in a kth motion vector estimating step where k is a natural number between 1 to n−1 inclusive; and
- a first prediction vector generating step of generating the first prediction vector based on a first motion vector of another input block which has been previously estimated in said first motion vector estimating step, and making a notification about the generated first prediction vector in said first motion vector estimating step.

17. An integrated circuit for segmenting an input picture into blocks of a predetermined size and estimating a motion vector of each input block with respect to a reference picture through an n-stage pipeline processing where n is a natural number of 2 or more, said circuit comprising:
- a first motion vector estimating unit operable to calculate an evaluation value on a per search block basis, based on an amount of distortion and a correction value, and estimate a first motion vector of an input block based on a location of the input block and a location of a search block which provides a smallest evaluation value, the amount of distortion being calculated using each of a plurality of search blocks of the predetermined size in a predetermined search area in the reference picture and the input block, and the correction value being calculated based on a motion vector with respect to each search block, a first prediction vector and a weighting coefficient;
- a k+1th motion vector estimating unit operable to estimate a k+1th motion vector of the input block based on a location of the input block and a location of the search block which provides a smallest evaluation value, by determining an amount of distortion as an evaluation value, the amount of distortion being calculated, on a per search block basis, using the input block and a plurality of search blocks in a predetermined search area having, as a center, a location identified by a kth motion vector estimated by a kth motion vector estimating unit where k is a natural number between 1 to n−1 inclusive; and
- a first prediction vector generating unit operable to generate the first prediction vector based on a first motion vector of another input block which has been previously estimated by said first motion vector estimating unit, and notify said first motion vector estimating unit of the generated first prediction vector.

* * * * *